United States Patent
Mizoguchi et al.

(10) Patent No.: US 9,789,875 B2
(45) Date of Patent: Oct. 17, 2017

(54) BRAKE/DRIVE FORCE CONTROLLING APPARATUS FOR VEHICLE

(75) Inventors: Yoji Mizoguchi, Sunto-gun (JP); Koji Taguchi, Isehara (JP); Hirokazu Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1230 days.

(21) Appl. No.: 12/676,235

(22) PCT Filed: Sep. 3, 2008

(86) PCT No.: PCT/JP2008/065895
§ 371 (c)(1),
(2), (4) Date: Mar. 3, 2010

(87) PCT Pub. No.: WO2009/031587
PCT Pub. Date: Mar. 12, 2009

(65) Prior Publication Data
US 2010/0168953 A1   Jul. 1, 2010

(30) Foreign Application Priority Data

Sep. 5, 2007 (JP) ................................ 2007-230122

(51) Int. Cl.
*B60W 30/18* (2012.01)
*B60W 10/184* (2012.01)
(Continued)

(52) U.S. Cl.
CPC ....... *B60W 30/18109* (2013.01); *B60K 23/04* (2013.01); *B60T 8/1755* (2013.01);
(Continued)

(58) Field of Classification Search
CPC ....... B60W 30/18109; B60W 2540/12; B60W 10/184; B60W 10/16; B60W 2520/14;
(Continued)

(56) References Cited

U.S. PATENT DOCUMENTS

| 4,671,373 A | 6/1987 | Sigl |
| 2002/0052681 A1 | 5/2002 | Matsuno |

(Continued)

FOREIGN PATENT DOCUMENTS

| DE | 33 42 574 A1 | 6/1985 |
| DE | 196 41 101 A1 | 4/1998 |

(Continued)

OTHER PUBLICATIONS

International Search Report dated Nov. 18, 2008 in corresponding International Application No. PCT/JP2008/065895 (with translation).

(Continued)

*Primary Examiner* — H Rojas
(74) *Attorney, Agent, or Firm* — Oliff PLC

(57) ABSTRACT

A brake/drive force controlling apparatus for a vehicle includes an engine for applying drive forces to driving wheels of the vehicles, a control diff for distributing the drive forces to the left and right driving wheels independently, and an electronic control system brake device for applying brake forces to the left and right driving wheels independently. An ECU is configured so as to be able to control the engine, the control diff, and the electronic control system brake device according to an operating state of the vehicle. When the electronic control system brake device is operated, this ECU stops the operation of the control diff, thereby avoiding a sudden input of load on the drive force distribution mechanism, regardless of the running state of the vehicle. This makes the apparatus simpler and more lightweight.

10 Claims, 2 Drawing Sheets

(51) Int. Cl.
  *B60W 10/06* (2006.01)
  *B60W 10/16* (2012.01)
  *B60K 23/04* (2006.01)
  *B60T 8/1755* (2006.01)

(52) U.S. Cl.
  CPC ....... *B60T 2201/14* (2013.01); *B60T 2260/08* (2013.01); *B60W 10/06* (2013.01); *B60W 10/16* (2013.01); *B60W 10/184* (2013.01); *B60W 2520/14* (2013.01); *B60W 2540/12* (2013.01)

(58) Field of Classification Search
  CPC .. B60W 10/06; B60T 8/1755; B60T 2201/14; B60T 2260/08; B60K 23/04
  See application file for complete search history.

(56) References Cited

U.S. PATENT DOCUMENTS

| | | | |
|---|---|---|---|
| 2003/0102713 A1 | 6/2003 | Murakami | |
| 2004/0041469 A1* | 3/2004 | Ishikawa et al. | 303/139 |
| 2005/0116536 A1* | 6/2005 | Schafiyha et al. | 303/139 |

FOREIGN PATENT DOCUMENTS

| | | |
|---|---|---|
| JP | A-5-345531 | 12/1993 |
| JP | A-06-305337 | 1/1994 |
| JP | A-8-108775 | 4/1996 |
| JP | A-09-086378 | 3/1997 |
| JP | A-10-29557 | 2/1998 |
| JP | A-10-338114 | 12/1998 |
| JP | B2-2848126 | 1/1999 |
| JP | A-2000-344077 | 12/2000 |
| JP | A-2002-120711 | 4/2002 |
| JP | A-2004-161197 | 6/2004 |
| WO | WO 2006/040343 A1 | 4/2006 |

OTHER PUBLICATIONS

Office Action issued in German Patent Application No. 11 2808 002 381.6 dated Jun. 16, 2011 (with translation).

Decision to Grant Patent issued Nov. 29, 2011 issued in Japanese Patent Application No. 2007-230122 (with translation).

Office Action issued in Japanese Patent Application No. 2007-230122 dated May 17, 2011 (with translation).

* cited by examiner

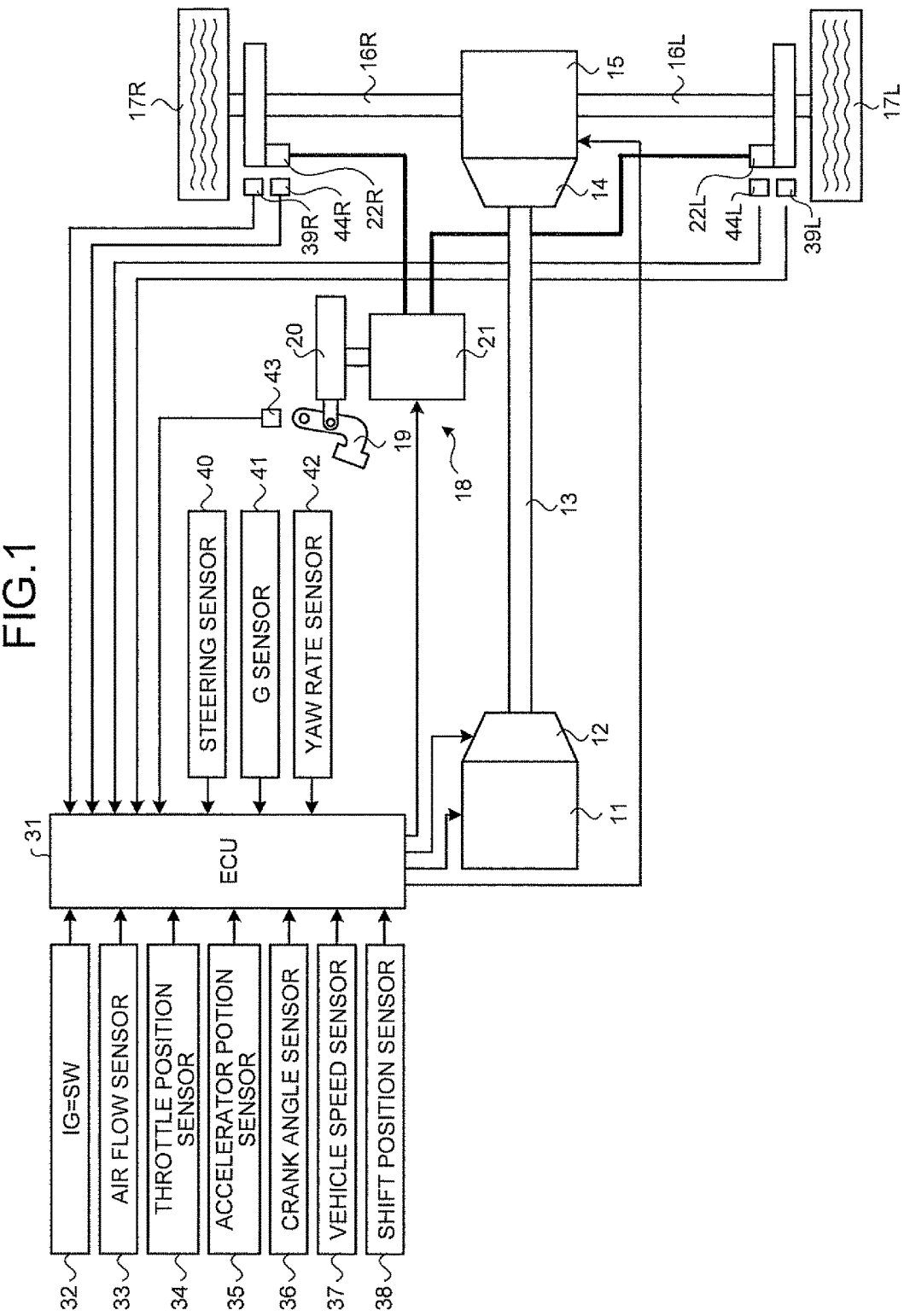

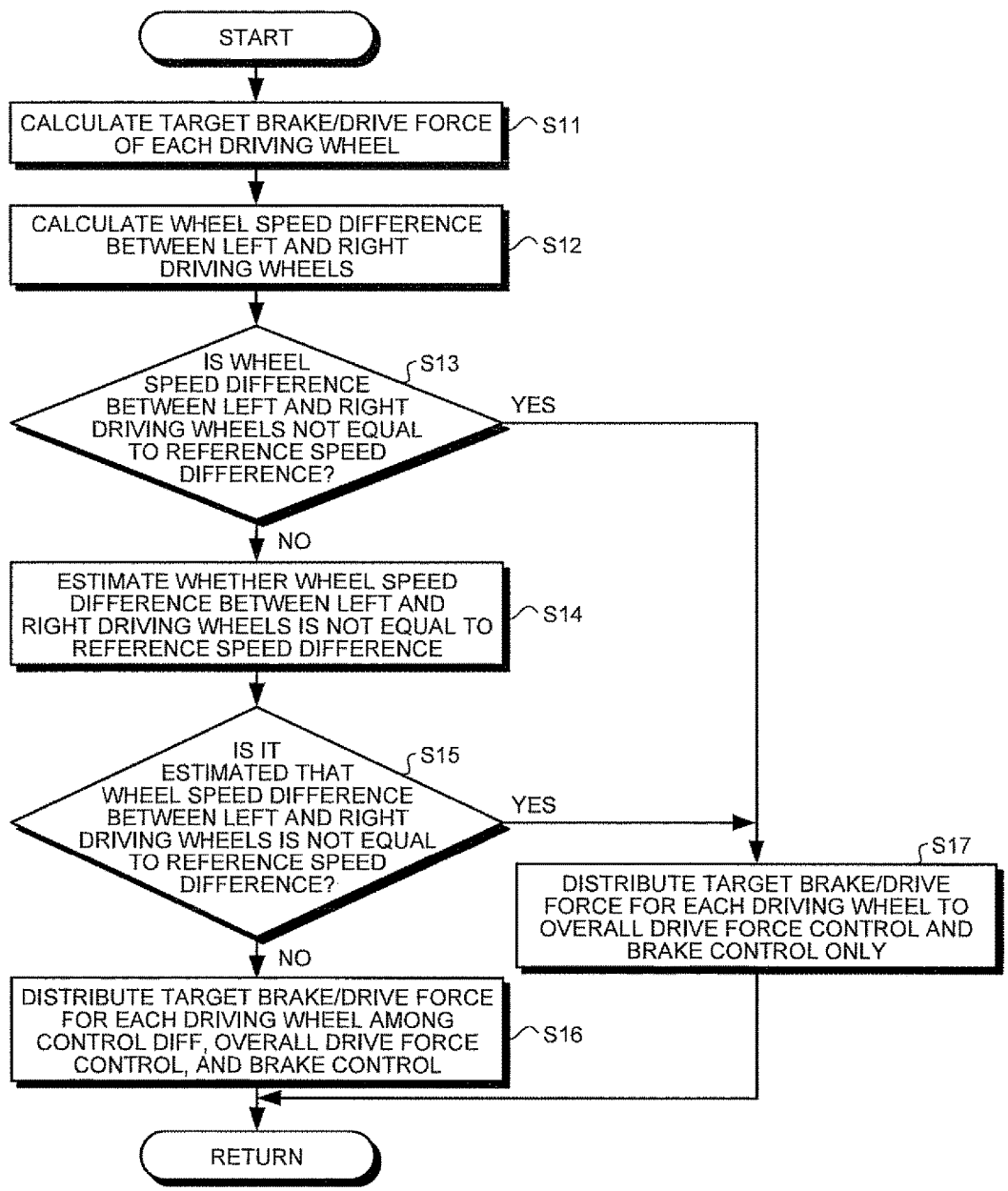

BRAKE/DRIVE FORCE CONTROLLING APPARATUS FOR VEHICLE

TECHNICAL FIELD

The present invention relates to a brake/drive force controlling apparatus for a vehicle, and more particularly the present invention relates to a brake/drive force controlling apparatus for a vehicle, which has a drive force distribution mechanism that distributes drive forces differentially to the left and right driving wheels.

BACKGROUND ART

Devices for distributing drive forces to the left and right driving wheels of a vehicle have been proposed. In one example of a left/right drive force distribution mechanism of a vehicle, the revolving speed of one of the left and right driving wheels is output after being increased or decreased by a predetermined change gear ratio; which output portion is then engaged with the other one of the left and right driving wheels, thereby transmitting drive torque from the faster revolving side to the slower revolving side. For example, if the revolving speed of one of the left and right driving wheels is increased and output, the revolving speed of this output portion becomes higher than the revolving speed of the other driving wheel during normal running where the revolving speed difference between the left and right driving wheels is small. Accordingly, this output portion is engaged with the other driving wheel, thereby transmitting drive torque from the one driving wheel on the faster revolving side to the other driving wheel on the slower revolving side, thus enabling required distribution of the drive force.

A vehicle incorporates an electronic control brake device, which has an ABS function that ensures braking performance by preventing a wheel from locking during sudden braking or braking on slippery road surface, and a brake assist function that ensures steering operation and vehicle stability. This electronic control braked device also has a TRC function that controls engine output by controlling oil pressure for the driving wheels, suppresses slippage of the driving wheels and ensures not only drive force appropriate to road surface conditions, but also the ability to accelerate from stand still, straight movement, and turning stability. Further, this electronic control brake device has a VSC function designed such that when wheels are at risk of skidding out of control, as in unexpected situations caused by road surface conditions, vehicle speed, sudden turning, or other external factors, engine output and brake control cooperate to reduce such risk.

Therefore, when the drive forces of the left and right driving wheels are distributed by the drive force distribution mechanism of the vehicle, the electronic control system brake device may control the drive of an engine and brake force of a brake. In this case, the electronic control brake device assumes importance, in control of motion of the vehicle, to the moment of the entire vehicle and target values of slip speeds of the driving wheel. This makes it difficult to control the speed difference between the left and right driving wheels, which are distributed by the drive force distributing mechanism.

If brake control, which uses the electronic control system brake device, and drive force distribution control for left and right driving wheels, which uses the drive force distribution mechanism, are simultaneously exerted, the speed difference between the left and right driving wheels increases, making it difficult to obtain a target vehicle behavior.

To overcome such a problem, a proposal has been disclosed in Patent Document 1 described below. In a left/right drive force adjusting device of a vehicle, disclosed in the Patent Document 1, a drive force transmission control mechanism for adjusting drive forces for the left and right driving wheels is disposed between the left and right rotational shafts of the vehicle. If the revolving speed ratio between the left and right wheels exceeds the boundary value at which the revolving speed ratio between the left and right wheels reverses between the output portion side of a transmission mechanism and the other rotating shaft side thereof, this drive force transmission control mechanism stops drive force transmission control exerted by a torque transmission mechanism.

Patent Document 1: Japanese Patent No. 2848126

DISCLOSURE OF THE INVENTION

Problem to be Solved by the Invention

The foregoing conventional left/right drive force adjusting device for the vehicle stops drive force transmission control when the revolving speed ratio between the left and right wheels exceeds a boundary value. Accordingly, degradation of the durability of the drive force transmission control mechanism can be prevented. However, when the vehicle slips, locks, or skids, the electronic control brake device inputs drive or brake force to the left and/or right driving wheels in order to suppress such motion. In this case, forces input to the left and right driving wheels in order to suppress vehicle slip or lock are subject to sudden change. Therefore, in order to improve its durability, the device has to be increased in size, which however makes it difficult to make the drive force transmission control mechanism simpler or more lightweight.

The present invention has been proposed to solve such problems. It is accordingly an object of the present invention to provide a brake/drive force controlling apparatus for a vehicle, which avoids a sudden input of changing load on a drive force distribution mechanism regardless of the running state of the vehicle and also makes the apparatus simpler and more lightweight.

Means for Solving Problem

In order to solve the above mentioned problem and achieve the object, a brake/drive force controlling apparatus for a vehicle according to the present invention, includes a drive source mounted in the vehicle; a drive force distribution mechanism that distributes drive force of the drive source to left and right wheels; a brake force application mechanism that applies brake force to the left and right wheels independently; and a control unit that controls the drive force distribution mechanism and the brake force application mechanism according to an operating state of the vehicle, wherein the control unit includes a drive force distribution control unit that controls operation of the drive force distribution mechanism according to an operating state of the brake force application mechanism.

In the brake/drive force controlling apparatus for a vehicle according to the present invention, the drive force distribution control unit exerts control such that when the brake force application mechanism is operated, the drive force distribution mechanism decreases a drive force distribution ratio between the left and right wheels.

In the brake/drive force controlling apparatus for a vehicle according to the present invention, the drive force distribution control unit stops the operation of the drive force distribution mechanism when the brake force application mechanism is operated.

In the brake/drive force controlling apparatus for a vehicle according to the present invention, the drive force distribution control unit includes a speed difference estimation control unit that estimate, if the current operating state of the vehicle continues, whether a speed difference between the left and right wheels exceeds a preset reference speed difference, and if the speed difference estimation control unit estimates that the speed difference between the left and right wheels exceeds the reference speed difference, the drive force distribution control unit stops the operation of the drive force distribution mechanism.

In the brake/drive force controlling apparatus for a vehicle according to the present invention, the drive force distribution control unit includes a speed difference determination control unit that determines based on the current operating state of the vehicle whether the speed difference between the left and right wheels has exceeded the present reference speed difference, and if the speed difference determination control unit determines that the speed difference between the left and right wheels has exceeded the reference speed difference, the drive force distribution control unit stops the operation of the drive force distribution mechanism.

In the brake/drive force controlling apparatus for a vehicle according to the present invention, the drive force distribution mechanism distributes the drive force to left and right driving wheels, the drive force distribution control unit stops the operation of the drive force distribution mechanism, when the brake force application mechanism applies brake force to the left and right driving wheels to which the drive force is distributed by the drive force distribution mechanism.

In the brake/drive force controlling apparatus for a vehicle according to the present invention, the drive force distribution control unit stops the operation of the drive force distribution mechanism, when the brake force application mechanism is operated for one of the left and right wheels.

In the brake/drive force controlling apparatus for a vehicle according to the present invention, when the brake force application mechanism is operated for both the left and right wheels, the drive force distribution control unit stops the operation of the drive force distribution mechanism, when deviations of brake pressures applied on the left and right wheels by the brake force application mechanism are equal to or greater than a predetermined value.

In the brake/drive force controlling apparatus for a vehicle according to the present invention, when the drive force distribution control unit controls the operation of the drive force distribution mechanism, the control unit controls the brake/drive force of the vehicle by use of the drive source and the brake force application mechanism.

Effect of the Invention

The brake/drive force controlling apparatus for the vehicle according to the present invention includes the drive source, the drive force distribution mechanism, and the brake force application mechanism. The control unit controls the drive force distribution mechanism and the brake force application mechanism according to the operating state of the vehicle. The drive force distribution control unit controls the operation of the drive force distribution mechanism according to the operating state of the brake force application mechanism. Accordingly, when the brake force application mechanism is operated and a speed difference between the left and right driving wheels suddenly increases, the operation of the drive force distribution mechanism is controlled beforehand regardless of the running state of the vehicle. Therefore, this controlling apparatus avoids sudden input of load on the drive force distribution mechanism, thus restraining the need to increase the size of the drive force distribution mechanism. This makes the apparatus simpler and more lightweight.

BRIEF DESCRIPTION OF DRAWINGS

FIG. 1 is a schematic view illustrating a configuration of a brake/drive force controlling apparatus for a vehicle according to an embodiment of the present invention.

FIG. 2 is a flowchart illustrating a vehicle behavior control according to the brake/drive force controlling apparatus for the vehicle of the embodiment.

EXPLANATIONS OF LETTERS OR NUMERALS 11 engine
12 automatic transmission
15 control diff (drive force distribution mechanism)
17L, 17R driving wheel (wheel)
18 electronic control system brake device (brake force application mechanism)
31 electronic control unit ECU (control unit, drive force distribution stop control unit, speed difference estimation control unit, speed difference determination control unit)
39L, 39R wheel speed sensor
44L, 44R brake wheel cylinder

BEST MODE FOR CARRYING OUT THE INVENTION

An embodiment of a brake/drive force controlling apparatus of a vehicle according to the present invention will now be described in detail with reference to accompanying drawings. However, the present invention is not limited thereto.

Embodiment

FIG. 1 is a schematic view illustrating a configuration of a brake/drive force controlling apparatus for a vehicle according to an embodiment of the invention. FIG. 2 is a flowchart illustrating vehicle behavior control exerted by the brake/drive force controlling apparatus for the vehicle according to the present embodiment.

In the brake/drive force controlling apparatus for the vehicle according to the embodiment, as shown in FIG. 1, an engine 11 serving as a drive source is mounted in the vehicle, and an automatic transmission 12 is mounted in the engine 11. The front end of a propeller shaft 13 is connected to an output shaft (not shown) of the automatic transmission 12. The other end of the propeller shaft 13 is connected to a viscous coupling 14 and a control differential (hereinafter referred to as "control diff") 15, which serves as a drive force distribution mechanism in the present invention. One end of a drive shaft 16L and one end of a drive shaft 16R are connected to the left and right sides, respectively, of the control diff 15. A driving wheel 17L and a driving wheel 17R are connected to the other ends of the left and right drive shafts 16L, 16R respectively.

Although the control diff 15 is not shown in detail, a transmission mechanism and a torque transmission mechanism (clutch) are provided on the left and right sides of a rear differential. This torque transmission mechanism can be operated by oil pressure supplied by a motor pump and adjusted by an oil pressure-regulating valve. Accordingly, the drive force of the engine 11 is decelerated by the automatic transmission 12 and this force is input to the control diff 15 via the propeller shaft 13 and the viscous coupling 14. Consequently, this drive force is transmitted to the left and right drive shafts 16L, 16R via the rear differential. Also, the revolving speed of one drive shaft 16L (or 16R) is accelerated or decelerated by the transmission mechanism, and this force is circulated in the direction of the input side of the rear differential via the torque transmission mechanism. Then, the drive force accelerated or decelerated is transmitted to the left and right drive shafts 16L, 16R via the rear differential. That is, the rotating speed of the other drive shaft 16R (or 16L) is accelerated or decelerated, enabling drive force to be distributed to the left and right driving wheels 17L, 17R in a predetermined ratio.

An electronic control system brake device 18 serving as a brake force application mechanism according to the present invention, applying brake force to each driving wheel 17L, 17R, is mounted in the vehicle. This electronic control system brake device 18 has: the ABS function that ensures braking performance by preventing a wheel from locking during sudden braking or braking on slippery road surface; the brake assist function that ensures steering operation and vehicle stability; the TRC function that controls engine output by controlling oil pressure for the driving wheels, suppresses slippage of the driving wheels, and ensures not only drive force appropriate to road surface conditions, but also the ability to accelerate from stand still, straight movement, and turning stability; and a VSC function designed such that when wheels are at risk of skidding out of control, as in unexpected situations caused by road surface conditions, vehicle speed, sudden turning, or other external factors, engine output and brake control cooperate to reduce such risk.

That is, in the electronic control system brake device 18, a master cylinder 20 is connected to a brake pedal 19 in order to pump hydraulic oil in response to the brake pedal 19 depressed by a driver. This master cylinder 20 is connected to a brake actuator 21, which includes a hydraulic pump, a pressure increasing valve, a pressure reducing valve, etc. Wheel cylinders 22L, 22R are connected to this brake actuator 21. The wheel cylinders 22L, 22R can apply brake forces to the driving wheels 17L, 17R by operating a brake caliper, thereby sandwiching brake discs rotated integrally with the corresponding drive shafts, 16L, 16R.

The vehicle has an electronic control unit (ECU) 31, serving as a control unit according to the present invention. This ECU 31 includes a microprocessor having a CPU as a key component. In addition to the CPU, the ECU 31 includes a ROM for storing a processing program, a RAM for temporarily storing data, an input/output port, and a communication port. The ECU 31 can control the engine 11, the automatic transmission 12, the control diff 15, the electronic control system brake device 18, etc.

Specifically, connected to the ECU 31 are: an ignition key switch 32; an air flow sensor 33 for detecting the amount of intake air; a throttle position sensor 34 for detecting the degree to which a throttle has been opened by a throttling operation; an accelerator position sensor 35 for detecting the degree to which an accelerator has been opened by an accelerator pedal operation; a crank angle sensor 36 for detecting the crank angle of the engine 11; and a vehicle speed sensor 37 for detecting vehicle speed.

Accordingly, based on the amount of intake air, the degree of throttle opening and the degree of accelerator opening, the crank angle (the number of engine revolutions), etc., all of which are detected by such sensors, the ECU 31 sets the amount of fuel injected by an injector, the timing of fuel injection, and the timing of ignition by an ignition plug, thereby controlling the engine 11.

Also connected to the ECU 31 is a shift position sensor 38 for detecting a shift position. Accordingly, based on the degree of throttle opening and the degree of accelerator opening, the crank angle (the number of engine revolutions), vehicle speed, shift position, etc., detected by such sensors, the ECU 31 sets gear speed and transmission timing, thereby controlling the automatic transmission 12.

Also connected to the ECU 31 are: wheel speed sensors 39L, 39R for detecting the revolving speed (hereinafter referred to as "wheel speed") of the driving wheels 17L, 17R; a steering sensor 40 for detecting steering angle set by the steering wheel; a G (Gravity) sensor 41 for detecting acceleration or deceleration of the vehicle; and a yaw rate sensor 42 for detecting the yaw angle of the vehicle. Based on the detected wheel speeds, steering angle, acceleration or deceleration, yaw angle, etc., the ECU 31 sets the distribution of drive force to the left and right driving wheels 17L, 17R, and controls the control diff 15.

Also connected to the ECU 31 are: a brake pedal stroke sensor 43 for detecting the degree to which the brake pedal 19 has been depressed (brake pedal stroke), and pressure sensors 44L, 44R for detecting oil pressure (wheel cylinder pressure) in the wheel cylinders 22L, 22R. Based on the detected brake pedal stroke, wheel cylinder pressure, wheel speeds, etc., the ECU 31 sets braking pressures for the left and right driving wheels 17L, 17R, and controls the electronic control system brake device 18 by operating the oil pressure pump, and pressure increasing and reducing valves.

That is, based on the accelerator pedal and steering wheel operated by a driver, the ECU 31 controls the drive of the engine 11 and automatic transmission, thereby adjusting the drive force to be output. The ECU 31 controls the control diff 15, thereby adjusting the distribution of drive force to the left and right driving wheels 17L, 17R. The ECU 31 also controls the electronic control system brake device 18 based on the brake pedal operated by the driver, thereby controlling the brake forces on the driving wheels 17L, 17R. In addition, based on the operating state of the vehicle, i.e., based on lock or slip of the driving wheels 17L, 17R, road surface conditions, external factors, etc., the ECU 31 controls the control diff 15 and the electronic control system brake device 18.

Incidentally, when the ECU 31 is distributing the drive forces of the left and right driving wheels 17L, 17R by operating the control diff 15, the electronic control system brake device 18 may be operated to apply brake forces to the left and right driving wheels 17L, 17R. In this case, the electronic control system brake device 18 assumes importance, in control of motion of the vehicle, to the moment of the entire vehicle and target values of slip speeds of the driving wheels 17L, 17R. Consequently, the difference between the left and right driving wheels 17L, 17R in terms of speed distributed by the control diff 15 suddenly increases. Such a sudden increase in speed difference between the left and right driving wheels 17L, 17R results in great load being suddenly exerted on the control diff 15. Accordingly, in order to ensure the durability of the apparatus, an increase in apparatus size is required.

In the brake/drive force controlling apparatus of the vehicle according to the present embodiment, in order to avoid the foregoing problem, the ECU (control unit) 31 stops the operation of the control diff (drive force distribution mechanism) 15 when the electronic control system brake device (brake force application mechanism) 18 operates (drive force distribution stop control unit). Specifically, if the current operating state of the vehicle continues, the ECU (drive force distribution stop control unit) 31 estimates whether the speed difference between the left and right driving wheels 17L, 17R exceeds a preset reference speed difference (by use of a speed difference estimation control unit). If it is estimated that the speed difference between the left and right driving wheels 17L, 17R exceeds the reference speed difference, the ECU 31 stops operation of the control diff 15 in advance. This reference speed difference is set based on the characteristics of this device (e.g., its durability, such as yield stress) and vehicle behavior characteristics.

Specifically, when the electronic control system brake device 18 is operated to apply brake force to one of the left and right driving wheels 17L, 17R, the operation of the control diff 15 is stopped. When the electronic control system brake device 18 is operated to apply brake forces to both the left and right driving wheels 17L, 17R, the ECU 31 stops operation of the control diff 15 when deviation of the brake pressure (wheel cylinder pressure) on each of the left and right driving wheels 17L, 17R is equal to or greater than a predetermined value.

Before estimating whether the speed difference between the left and right driving wheels 17L, 17R may exceed the reference speed difference, the ECU 31 determines (by use of a speed difference determination control unit), based on the current operating state of the vehicle, whether the speed difference between the left and right driving wheels 17L, 17R exceeds the reference speed difference. If the determination is made that the speed difference between the left and right driving wheels 17L, 17R exceeds the reference speed difference, the ECU 31 stops operation of the control diff 15.

When stopping operation of the control diff 15, the ECU 31 controls the drive and brake forces of the vehicle by use of the engine 11 and the electronic control system brake device 18.

Next, vehicle behavior control exerted by the foregoing brake/drive force controlling apparatus of the vehicle according to the present embodiment will be described in detail with reference to a flowchart in FIG. 2.

As shown in FIG. 2, in the vehicle behavior control exerted by the brake/drive force controlling apparatus of the vehicle according to the present embodiment, the ECU 31 calculates target brake/drive force of each driving wheel 17L, 17R in step S11. In this case, the target brake/drive force is calculated based on the degree of accelerator opening, steering angle, yaw angle, vehicle speed, acceleration, deceleration, brake pedal stroke (or force applied to the brake), etc. Subsequently, in step S12, the ECU 31 calculates the speed difference between the left and right driving wheels 17L, 17R. In this case, this speed difference is calculated based on deviations on the wheel side of the driving wheels 17L, 17R.

In step S13, the ECU 31 determines whether the current speed difference between the left and right driving wheels 17L, 17R exceeds the reference speed difference. If it is determined that the current speed difference between the left and right driving wheels 17L, 17R exceeds the reference speed difference, the ECU 31 proceeds to step S17, then stops operation of the control diff 15, and distributes the target brake/drive force of each driving wheel 17L, 17R, to overall drive force control and brake control only. This distributing method will be described later.

In step S13, if the ECU 31 determines that the current speed difference between the left and right driving wheels 17L, 17R does not exceed the reference speed difference, the ECU 31 estimates in step S14 whether the speed difference between the left and right driving wheels 17L, 17R exceeds the reference speed difference. This estimation is made based on two determining processes. In the first determining process, the estimation is made by comparing the speed of each driving wheel 17L, 17R with the vehicle speed. That is, if the speed of each driving wheel 17L, 17R, is $V_H$, and the reduced value of the wheel speed in the position of each driving wheel 17L, 17R, found from the vehicle speed, is $V_B$, the determination can be made using mathematical expression 1 given below.

$$0.95 V_B \leq V_H \leq 1.1 V_B \qquad (1)$$

Where $V_H$ is 0.95 $V_B$ or lower, it is estimated that each driving wheel 17L, 17R is slipping. Where $V_H$ is 1.1 $V_B$ or higher, it is estimated that each driving wheel 17L, 17R is locking. Accordingly, if the mathematical expression 1 is not satisfied, the determination can be made that the left and right driving wheels 17L, 17R are slipping.

For example, the estimation may be made using coefficient μ of friction of a road surface, the brake/drive force Fx of each driving wheel 17L, 17R, lateral force Fy, and ground contact load Fz. That is, based on these, a determination can be made using mathematical expression 2 given below. In this case, the coefficient μ of friction of a road surface is calculated based on the vehicle weight, together with the brake or drive force of each driving wheel 17L, 17R. The brake/drive force Fx of each driving wheel 17L, 17R, lateral force Fy, and ground contact load Fz may be measured in advance by sensors provided for the vehicle, or may be calculated based on the detected value of the G sensor 41, taking the vehicle weight, engine output, brake force, etc., into account.

$$\mu F_z \leq \sqrt{Fx^2 + Fy^2} \qquad (2)$$

In this case, if the value obtained by multiplying the coefficient μ of friction of a road surface by the brake/drive force Fx of each driving wheel 17L, 17R is equal to or greater than the value obtained by adding the brake/drive force Fx of each driving wheel 17L, 17R and the lateral force Fy, an estimation can be made that slippage may be caused. Therefore, if the mathematical expression 2 is not satisfied, the determination can be made that left or right driving wheel 17L, 17R may be slipping.

Subsequently, in the second determining process, if it is determined that each driving wheel 17L, 17R is slipping as a result of the first determining process, an estimate is made that the speed difference between the left and right driving wheels 17L, 17R exceeds the reference speed difference, according to the number of driving wheels 17L, 17R that are slipping. Specifically, if it is determined that none of the driving wheels 17L, 17R is slipping, the estimation is not made that the speed difference between the left and right driving wheels 17L, 17R exceeds the reference speed difference. Additionally, if it is determined that one of the driving wheels 17L, 17R is slipping, the estimation is made that the speed difference between the left and right driving wheels 17L, 17R exceeds the reference speed difference.

Further, if it is determined that two of the driving wheels 17L, 17R are slipping, an estimation is made, using Mathematical expression 3 given below, whether the speed difference between the left and right driving wheels 17L, 17R exceeds the reference speed difference. In this case, the wheel cylinder pressures of the left and right driving wheels 17L, 17R are represented by PL, PR, respectively, the coefficients of friction between the road surface and the left and right driving wheels 17L, 17R are represented by μL, μR, and the determination threshold value is represented by c.

$$|f(PR,\mu R)-f(PL,\mu L)|\leq c \quad (3)$$

Here, if the absolute value of the deviation between the reduced value obtained using the wheel cylinder pressure PL of the left driving wheel 17L and the coefficient μL of friction of the road surface and the reduced value obtained using the wheel cylinder pressure PR of the right driving wheel 17R and the coefficient μR of friction of the road surface is equal to or below the determination threshold value c, it is assumed that the electronic control system brake device 18 controls the left and right driving wheels 17L, 17R differently. Accordingly, if the mathematical expression 3 given above is not satisfied, it is estimated that the speed difference between the left and right driving wheels 17L, 17R exceeds the reference speed difference.

Here, a reduced value obtained using the wheel cylinder pressure PL of the left driving wheel 17L and the coefficient μL of friction of the road surface, and a reduced value obtained using the wheel cylinder pressure PR of the right driving wheel 17R and the coefficient μR of friction of the road surface can be calculated using mathematical expression 4 given below.

$$f(P,\mu)=P/\mu \quad (4)$$

Then, if it is estimated that the speed difference between the left and right driving wheels 17L, 17R exceeds the reference speed difference in step S15, the ECU 31 proceeds to step S17, then stops the operation of control diff 15, and distributes the target brake/drive forces of the driving wheels 17L, 17R by based on the overall drive force control and brake control only. If it is estimated that the speed difference between the left and right driving wheels 17L, 17R is equal to or less than the reference speed difference, the ECU 31 proceeds to step S16 and distributes the target brake/drive forces of the driving wheels 17L, 17R among the overall drive force control, the control diff 15, and brake control.

The method for distributing the target brake/drive forces of the driving wheels 17L, 17R in step S16 among the overall drive force control, the control diff 15, and brake control will now be described.

(1) If the target brake/drive forces of the driving wheels 17L, 17R are equal to or greater than the minimum drive force, and the difference between the drive forces FxRL and FxRR of the left and right driving wheels 17L, 17R respectively is equal to or below the permissible reference value D of the control diff 15, the distribution is conducted, in the manner described below, for the overall drive force control using the engine 11, wheel speed difference control using the control diff 15, and for the brake (brake force) control using the electronic control system brake device 18. The minimum drive force means any brake force generated by an engine brake. In addition, the permissible reference value D of the control diff 15 means the upper limit of the speed difference between the left and right driving wheels 17L, 17R, which can be controlled by the control diff 15.
Engine: FxRL+FxRR
control diff: FxRL−FxRR
Electronic control system brake device:
Left driving wheel: 0
Right driving wheel: 0

(2) If the target brake/drive forces of the driving wheels 17L, 17R are equal to or greater than the minimum drive force of the vehicle, and the difference between the drive forces FxRL and FxRR of the left and right driving wheels 17L, 17R respectively is beyond the permissible reference value D of the control diff 15, distribution among the engine 11, the control diff 15, and the electronic control system brake device 18 is conducted in the manner described below.
Engine: FxRL+FxRR+|FxRL−FxRR|−D
control diff D
Electronic control system brake device:
If FxRL<FxRR,
Left driving wheel:—(FxRL−FxRR−D)
Right driving wheel: 0
If FxRL>FxRR,
Left driving wheel: 0
Right driving wheel:—(FxRL−FxRR−D)

(3) If the target brake/drive forces of the driving wheels 17L, 17R are equal to or less than the minimum drive force of the vehicle, the distribution among the engine 11, the control diff 15, and the electronic control system brake device 18 is conducted in the manner described below.
Engine: 0
control diff: 0
Electronic control system brake device:
Left driving wheel: Min (0, FxRL)
Right driving wheel: Min (0, FxRR)

Next will be described the method for distributing the target brake/drive forces of the driving wheels 17L, 17R in step S17 by using the overall drive force and brake controls.

(1) If the target brake/drive forces of the driving wheels 17L, 17R are equal to or greater than the minimum drive forces, distribution to the engine 11 and the electronic control system brake device 18 is conducted in the manner described below.
Engine: FxRL+FxRR+|FxRL−FxRR|
Electronic control system brake device:
If FxRL<FxRR,
Left driving wheel:—(FxRL−FxRR−D)
Right driving wheel: 0
If FxRL>FxRR,
Left driving wheel: 0
Right driving wheel:—(FxRL−FxRR−D)

(2) If the target brake/drive forces of the driving wheels 17L, 17R are equal to or less than the minimum drive force of the vehicle, distribution to the engine 11 and the electronic control system brake device 18 is conducted in the manner described below.
Engine: 0
Electronic control system brake device:
Left driving wheel: Min (0, FxRL)
Right driving wheel: Min (0, FxRR)

As described above, the brake/drive force controlling apparatus of the vehicle according to the present embodiment includes: the engine 11 configured to apply drive forces to the driving wheels 17L, 17R of the vehicle; the control diff 15 configured to distribute these drive forces to the left and right driving wheels 17L, 17R; and the electronic control system brake device 18 configured to apply brake forces to the left and right driving wheels 17L, 17R independently. The ECU 31 is able to control the engine 11, the control diff 15, and the electronic control system brake device 18 independently according to the operating state of the vehicle. This ECU 31 stops operation of the control diff 15 when the electronic control system brake device 18 is operated.

Accordingly, if the electronic control system brake device 18 is operated and the speed difference between the left and right driving wheels 17L, 17R exceeds the reference speed difference, the ECU 31 stops operation of the control diff 15 beforehand regardless of the running state of the vehicle. This avoids a sudden input of load on the control diff 15. Accordingly, the durability of the control diff 15 is improved and increase in size of the device is suppressed, thus actualizing a compact, lightweight device. Here, a sudden input of load means that the amount of change in input load is large. The present embodiment can suppress such a large change.

If the current operating state of the vehicle continues, the ECU 31 estimates whether the speed difference between the left and right driving wheels 17L, 17R exceeds the preset reference speed difference. If it is estimated that the speed difference between the left and right driving wheels 17L, 17R exceeds the reference speed difference, the ECU 31 stops operation of the control diff 15.

Accordingly, when the electronic control system brake device 18 is operated, it is estimated that a speed difference may arise between the left and right driving wheels 17L, 17R. In such a case, estimating whether the speed difference between the left and right driving wheels 17L, 17R exceeds the reference speed difference makes it possible to estimate a sudden input of load on the control diff 15 earlier and avoid this. Thus, the durability of the control diff 15 can be improved despite the simple configuration.

Specifically, when the electronic control system brake device 18 operates for one of the left and right driving wheels 17L, 17R, the ECU 31 stops the operation of control diff 15. When the electronic control system brake device 18 operates for both the left and right driving wheels 17L, 17R, the ECU 31 stops the operation of control diff 15 when deviations of the wheel cylinder pressures on the left and right driving wheels 17L, 17R are equal to or greater than the predetermined value. Accordingly, whether the control diff 15 is operated or stopped can be determined based on the wheel cylinder pressures on slipping wheel or driving wheels 17L, 17R. Accordingly, controllability can be improved.

In the present embodiment, based on the current operating state of the vehicle, the ECU 31 determines whether the speed difference between the driving wheels 17L, 17R has exceeded the preset reference speed difference. When a determination is made that the speed difference between the left and right driving wheels 17L, 17R has not exceeded the reference speed difference and if the current operating state of the vehicle continues, the ECU 31 estimates whether the speed difference between the left and right driving wheels 17L, 17R will exceed the reference speed difference. Therefore, a sudden input of load on the control diff 15 can be determined precisely and whether the control diff 15 is operated or stopped can be determined with a high degree of accuracy.

In the present embodiment, when stopping operation of the control diff 15, the ECU 31 controls the brake/drive force of the vehicle by using the engine 11 and the electronic control system brake device 18. Accordingly, a driver can run the vehicle stably with no load on the control diff 15.

In the foregoing embodiment, the operation of control diff 15 is stopped when the electronic control system brake device 18 is operated. However, the present invention is not limited to this configuration. Specifically, the brake/drive force controlling apparatus for the vehicle according to the present invention controls the operation of the control diff 15 according to the operating state of the electronic control system brake device 18. Therefore, for example, control may be exerted such that when the electronic control system brake device 18 is operated, the drive force distribution ratio between the left and right wheels is minimized by the control diff 15. Specifically, in order to avoid a sudden input of load on the control diff 15, control may be exerted such that the drive force distribution ratio between the left and right wheels approximates 1:1. Not only is the drive force distribution ratio between the left and right driving wheels 17L, 17R decreased, but also the drive force distribution may be corrected so as to approach the drive force distribution requested by the brake/drive force controlling apparatus. That is, any configuration may be used as long as control of the control diff 15 is corrected according to the operating state of the electronic control system brake device 18.

In the foregoing embodiment, a description was given of a case where the brake/drive force controlling apparatus of a vehicle according to the present invention is used in a vehicle that has, as a drive source, only an engine. However, this apparatus can also be used in a hybrid vehicle that has, as a drive source, an engine and motor.

INDUSTRIAL APPLICABILITY

As described above, the brake/drive force controlling apparatus for the vehicle according to the present invention controls operation of the drive force distribution mechanism according to the operating state of the brake force application mechanism. Accordingly, regardless of the running state of the vehicle, this controlling apparatus avoids sudden input of load caused by a speed difference between the left and right driving wheels, thus making it possible to make the apparatus simpler and more lightweight. The brake/drive force controlling apparatus is useful in a vehicle that has a drive force distribution mechanism and brake force application mechanism.

The Invention claimed is:

1. A brake/drive force controlling apparatus for a vehicle, the brake/drive force controlling apparatus comprising:
   a drive source mounted in the vehicle;
   a drive force distribution mechanism that distributes drive force of the drive source to left and right driving wheels;
   a brake force application mechanism that applies brake force to the left and right driving wheels independently; and
   a control unit that controls the drive force distribution mechanism and the brake force application mechanism according to an operating state of the vehicle, wherein
   the control unit includes a drive force distribution control unit that controls operation of the drive force distribution mechanism according to an operating state of the brake force application mechanism,
   the drive force distribution control unit includes a speed difference estimation control unit that compares speed of each of the left and right driving wheels with a first equivalent value of wheel speed in a position of each of the left and right driving wheels obtained from vehicle speed, and estimates that the left and right driving wheels are slipping when the speed of each driving wheel is not within a predetermined range of the first equivalent value of the wheel speed, and
   in a case where it is determined that the driving wheels are slipping, the speed difference estimation control unit further estimates that a speed difference between the left and right driving wheels exceeds a preset reference speed difference, when an absolute value of a deviation between a second equivalent value and a third equivalent value is greater than a determination threshold value, the second equivalent value being obtained using wheel cylinder pressure of the left driving wheel and a coefficient of friction of a road surface of the left driving wheel, the third equivalent value being obtained using the wheel cylinder pressure of the right driving wheel and the coefficient of friction of the road surface of the right driving wheel, where the coefficient of friction of the road surface of each of the driving wheels is calculated based on the vehicle weight, together with the brake or drive force of each of the driving wheels, and when the speed difference estimation control unit estimates that the speed difference between the left and right driving wheels exceeds the reference speed difference, the drive force distribution control unit stops the operation of the drive force distribution mechanism.

2. The brake/drive force controlling apparatus for a vehicle according to claim 1, wherein the drive force distribution control unit includes a speed difference determination control unit that determines based on a current operating state of the vehicle whether the speed difference between the left and right driving wheels has exceeded the present reference speed difference, and if the speed difference determination control unit determines that the speed difference between the left and right driving wheels has exceeded the reference speed difference, the drive force distribution control unit stops the operation of the drive force distribution mechanism.

3. The brake/drive force controlling apparatus for a vehicle according to claim 2, wherein the drive force distribution mechanism distributes the drive force to left and right driving wheels, the drive force distribution control unit stops the operation of the drive force distribution mechanism, when the brake force application mechanism applies brake force to the left and right driving wheels to which the drive force is distributed by the drive force distribution mechanism.

4. The brake/drive force controlling apparatus for a vehicle according to claim 2, wherein the drive force distribution control unit stops the operation of the drive force distribution mechanism, when the brake force application mechanism is operated for one of the left and right driving wheels.

5. The brake/drive force controlling apparatus for a vehicle according to claim 2, wherein when the brake force application mechanism is operated for both the left and right driving wheels, the drive force distribution control unit stops the operation of the drive force distribution mechanism, when deviations of brake pressures applied on the left and right driving wheels by the brake force application mechanism are equal to or greater than a predetermined value.

6. The brake/drive force controlling apparatus for a vehicle according to claim 1, wherein the drive force distribution mechanism distributes the drive force to left and right driving wheels, the drive force distribution control unit stops the operation of the drive force distribution mechanism, when the brake force application mechanism applies brake force to the left and right driving wheels to which the drive force is distributed by the drive force distribution mechanism.

7. The brake/drive force controlling apparatus for a vehicle according to claim 6, wherein when the brake force application mechanism is operated for both the left and right driving wheels, the drive force distribution control unit stops the operation of the drive force distribution mechanism, when deviations of brake pressures applied on the left and right driving wheels by the brake force application mechanism are equal to or greater than a predetermined value.

8. The brake/drive force controlling apparatus for a vehicle according to claim 1, wherein the drive force distribution control unit stops the operation of the drive force distribution mechanism, when the brake force application mechanism is operated for one of the left and right driving wheels.

9. The brake/drive force controlling apparatus for a vehicle according to claim 8, wherein when the brake force application mechanism is operated for both the left and right driving wheels, the drive force distribution control unit stops the operation of the drive force distribution mechanism, when deviations of brake pressures applied on the left and right driving wheels by the brake force application mechanism are equal to or greater than a predetermined value.

10. The brake/drive force controlling apparatus for a vehicle according to claim 1, wherein when the brake force application mechanism is operated for both the left and right driving wheels, the drive force distribution control unit stops the operation of the drive force distribution mechanism, when deviations of brake pressures applied on the left and right driving wheels by the brake force application mechanism are equal to or greater than a predetermined value.

* * * * *